(12) United States Patent
Tona et al.

(10) Patent No.: US 10,815,959 B2
(45) Date of Patent: Oct. 27, 2020

(54) METHOD FOR CONTROLLING A WAVE POWER SYSTEM BY MEANS OF AN INTEGRAL PROPORTIONAL-CONTROL LAW

(71) Applicant: IFP Energies nouvelles, Rueil-Malmaison (FR)

(72) Inventors: Paolino Tona, Lyons (FR); Hoai-Nam Nguyen, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/496,872

(22) PCT Filed: Feb. 26, 2018

(86) PCT No.: PCT/EP2018/054700
§ 371 (c)(1),
(2) Date: Sep. 23, 2019

(87) PCT Pub. No.: WO2018/172019
PCT Pub. Date: Sep. 27, 2018

(65) Prior Publication Data
US 2020/0095972 A1    Mar. 26, 2020

(30) Foreign Application Priority Data
Mar. 22, 2017 (FR) .................... 17 52337

(51) Int. Cl.
*F03B 13/16* (2006.01)
*F03B 15/02* (2006.01)

(52) U.S. Cl.
CPC ............ *F03B 13/16* (2013.01); *F03B 15/02* (2013.01)

(58) Field of Classification Search
CPC ................................ F03B 13/16; F03B 15/02
(Continued)

(56) References Cited

U.S. PATENT DOCUMENTS 7,305,823 B2 * 12/2007 Stewart ............... F03B 13/1845
60/495
7,755,224 B2 * 7/2010 Beane ..................... F03B 13/20
310/12.12

(Continued)

FOREIGN PATENT DOCUMENTS

FR       2876751 A1     4/2006
FR       2973448 A1    10/2012
(Continued)

OTHER PUBLICATIONS

International Search Report for PCT/EP2018/054700, dated May 14, 2018; English translation submitted herewith (7 pgs.).
(Continued)

*Primary Examiner* — Pedro J Cuevas
(74) *Attorney, Agent, or Firm* — Fitch, Even, Tabin & Flannery LLP

(57) ABSTRACT

The present invention is a method of controlling a wave energy system (COM), wherein the force $f_{ex}$ exerted by the waves on a mobile float of the wave energy system is estimated, then at least one dominant frequency $\omega_{ex}$ of the force exerted by the waves on the mobile float is determined using an unscented Kalman filter (UKF), and the control (COM) of the wave energy system is determined by a variable-gain PI control law whose coefficients are a function of dominant frequency $\omega_{ex}$.

20 Claims, 5 Drawing Sheets

(58) Field of Classification Search
USPC .................................................. 290/42, 53
See application file for complete search history.

(56) References Cited

U.S. PATENT DOCUMENTS

| | | | | |
|---|---|---|---|---|
| 7,759,814 | B2* | 7/2010 | Oigarden | F03B 13/20 290/53 |
| 7,896,576 | B2* | 3/2011 | Jean | E02B 9/08 405/76 |
| 7,989,975 | B2* | 8/2011 | Clement | F03B 13/20 290/53 |
| 8,067,849 | B2* | 11/2011 | Stewart | F03B 13/20 290/53 |
| 8,269,365 | B2* | 9/2012 | Clement | F03B 13/20 290/53 |
| 8,519,557 | B2* | 8/2013 | Beane | F03B 13/20 290/53 |
| 8,587,139 | B2* | 11/2013 | Gerber | F03B 15/00 290/42 |
| 8,701,403 | B2* | 4/2014 | Beane | F03B 13/20 60/496 |
| 8,723,351 | B2* | 5/2014 | Stewart | F03B 11/00 290/53 |
| 8,723,353 | B1* | 5/2014 | Franklin | F03B 13/20 290/53 |
| 8,723,355 | B2* | 5/2014 | Eder | F03B 13/16 307/9.1 |
| 8,766,470 | B2* | 7/2014 | Beane | F03B 13/20 290/53 |
| 8,824,239 | B2* | 9/2014 | Welker | G01V 1/3835 367/16 |
| 8,890,344 | B2* | 11/2014 | Hoffmann | F03B 13/20 290/42 |
| 8,915,078 | B2* | 12/2014 | Beane | F03B 13/182 60/505 |
| 9,068,552 | B2* | 6/2015 | Kawaguchi | F03B 13/186 |
| 9,115,686 | B2* | 8/2015 | Stewart | F03B 13/20 |
| 9,140,231 | B1* | 9/2015 | Wilson | F03B 13/20 |
| 10,197,040 | B2* | 2/2019 | Abdelkhalik | F03B 13/16 |
| 10,344,736 | B2* | 7/2019 | Abdelkhalik | G06F 1/022 |
| 10,415,537 | B2* | 9/2019 | Abdelkhalik | G06F 1/02 |
| 10,423,126 | B2* | 9/2019 | Wilson | F03B 15/00 |
| 10,488,828 | B2* | 11/2019 | Abdelkhalik | F03B 15/00 |
| 10,697,422 | B2* | 6/2020 | Nguyen | F03B 13/16 |
| 2008/0224472 | A1* | 9/2008 | Bean | H02K 7/1853 290/42 |
| 2008/0309088 | A1* | 12/2008 | Agamloh | H02K 7/1876 290/53 |
| 2009/0008942 | A1 | 1/2009 | Clement et al. | |
| 2009/0085357 | A1* | 4/2009 | Stewart | F03B 13/16 290/53 |
| 2009/0141587 | A1* | 6/2009 | Welker | G01V 1/3826 367/16 |
| 2009/0160191 | A1* | 6/2009 | Beane | F03B 13/20 290/53 |
| 2010/0148504 | A1* | 6/2010 | Gerber | F03B 13/16 290/42 |
| 2011/0187101 | A1* | 8/2011 | Beane | F03B 13/20 290/42 |
| 2011/0286302 | A1* | 11/2011 | Welker | G01V 1/3826 367/16 |
| 2012/0001432 | A1* | 1/2012 | Clement | F03B 13/20 290/53 |
| 2012/0248865 | A1* | 10/2012 | Eder | F03B 13/16 307/9.1 |
| 2012/0319406 | A1* | 12/2012 | Hoffmann | F03B 13/183 290/53 |
| 2013/0161948 | A1* | 6/2013 | Sarokhan | F03B 13/14 290/42 |
| 2013/0229011 | A1* | 9/2013 | Kawaguchi | F03B 13/186 290/42 |
| 2013/0341921 | A1* | 12/2013 | Beane | H02K 7/1876 290/42 |
| 2014/0084586 | A1 | 3/2014 | Henwood et al. | |
| 2014/0138953 | A1* | 5/2014 | Franklin | F03B 13/20 290/53 |
| 2014/0265338 | A1* | 9/2014 | Bretl | F03B 13/1845 290/53 |
| 2015/0016218 | A1* | 1/2015 | Welker | G01V 1/3817 367/16 |
| 2017/0298899 | A1* | 10/2017 | Abdelkhalik | G05B 19/406 |
| 2018/0163690 | A1* | 6/2018 | Abdelkhalik | G06F 1/022 |
| 2018/0163691 | A1* | 6/2018 | Abdelkhalik | G06F 1/02 |
| 2018/0164754 | A1* | 6/2018 | Wilson | F03B 15/00 |
| 2018/0313321 | A1* | 11/2018 | Nguyen | G01C 13/004 |
| 2019/0093623 | A1* | 3/2019 | Nguyen | H02P 21/143 |
| 2019/0277244 | A1* | 9/2019 | Tona | F03B 15/00 |
| 2020/0095973 | A1* | 3/2020 | Tona | F03B 15/00 |

FOREIGN PATENT DOCUMENTS

| | | |
|---|---|---|
| WO | 2007/137426 A1 | 12/2007 |
| WO | 2009/081042 A1 | 7/2009 |
| WO | 2012/131186 A2 | 10/2012 |

OTHER PUBLICATIONS

Ringwood John V et al: "Energy-Maximizing Control of Wave-Energy Converters: The Development of Control System Technology to Optimize Their Operation", IEEE Control Systems, IEEE, USA, vol. 34, No. 5, Oct. 1, 2014 (Oct. 1, 2014), pp. 30-55, XP011558952.

Francesco Fusco et al: "Short Term Wave Forecasting for Real-Time Control of Wave Energy Converters", IEEE Transactions on Sustainable Energy, IEEE, USA, vol. 1, No. 2, Jul. 1, 2010 (Jul. 1, 2010), pp. 99-106, XP011328229.

* cited by examiner

METHOD FOR CONTROLLING A WAVE POWER SYSTEM BY MEANS OF AN INTEGRAL PROPORTIONAL-CONTROL LAW

CROSS REFERENCE TO RELATED APPLICATIONS

Reference is made to PCT/EP2018/054700 filed Feb. 26, 2018, designating the United States, and French Application No. 17/52.337 filed Mar. 22, 2017, which are incorporated herein by reference in their entirety.

BACKGROUND OF THE INVENTION

Field of the Invention

The invention relates to devices for converting wave energy into electrical or hydraulic energy.

Description of the Prior Art

Renewable energy resources have generated strong interest for years. They are clean, free and inexhaustible, which are major assets in a world facing the inexorable depletion of the available fossil resources and recognizing the need to preserve the planet. Among these resources, the wave energy, a source relatively unknown amidst those widely publicized, such as wind or solar energy, contributes to the vital diversification of the exploitation of renewable energy sources. The devices, commonly referred to as "wave energy devices", are particularly interesting because they allow electricity to be produced from this renewable energy source (the potential and kinetic wave energy) without greenhouse gas emissions. They are particularly well suited for providing electricity to isolated island sites.

BACKGROUND OF THE INVENTION

For example, patent applications FR-2,876,751, FR-2,973,448 and WO-2009/081,042 describe devices intended to capture the energy produced by the sea water forces. These devices are made up of a floating support structure on which a pendulum movably mounted with respect to the floating support is arranged. The relative motion of the pendulum with respect to the floating support is used to produce electrical energy with an energy converter machine (an electrical machine for example). The converter machine operates as a generator and as a motor. Indeed, in order to provide torque or a force driving a mobile floating device, power is supplied to the converter machine to bring it into resonance with the waves (motor mode). On the other hand, to produce a torque or a force that withstands the motion of the mobile floating device, power is recovered via the converter machine (generator mode).

The motion of the mobile floating device is thus controlled by the energy converter machine to promote energy recovery. In order to optimize the electrical energy recovered by wave energy systems, various converter machine control methods have been considered. Some are not optimal because the wave motion prediction is not taken into consideration. Furthermore, these methods do not take account for the energy losses upon energy conversion in the wave energy system. For example, patent application FR-2,973,448 (WO-2012/131,186) describes such a method.

PI control is a well-known approach for controlling wave energy systems. For example, the document by Ringwood, J. V., entitled Control Optimisation and Parametric Design, in Numerical Modelling of Wave Energy Converters: State-of-the-Art Techniques for Single WEC and Converter Arrays (M. Folly Ed.), Elsevier, 2016, describes such an approach. Adaptive versions in relation to the sea state (that is whose parameters vary depending on the sea state) have been presented in the literature, for example in the following documents:

Whittaker, T., Collier, D., Folley, M., Osterried, M., Henry, A., & Crowley, M. (2007, September). The Development of Oyster—a Shallow Water Surging Wave Energy Converter. In Proceedings of the 7th European Wave and Tidal Energy Conference, Porto, Portugal (pp. 11-14).

Hansen, Rico H and Kramer, Morten M., "Modelling and Control of the Wavestar Prototype". In: Proceedings of 2011 European Wave and Tidal Energy Conference (2011).

Hals, J., Falnes, J. and Moan, T., "A Comparison of Selected Strategies for Adaptive Control of Wave Energy Converters". In: J. Offshore Mech. Arct. Eng. 133.3 (2011).

For all these methods, the approach used is gain scheduling, or gain pre-programming which is a set of optimal gains or parameters (one gain for the P control, two gains for the PI control) which are calculated offline, analytically or numerically, for a set of sea states, to complete maps (charts) of gains as a function of the sea state. For the methods described in these documents, updating the PI gains is always done from averaged estimations, over time windows of several minutes (between 10 and 30 minutes for example). These methods therefore do not allow adapting the gains "wave by wave", i.e. at a frequency corresponding to the real-time control frequency (ranging between 10 and 100 Hz for example, that is a sampling period ranging between 10 and 100 ms). Thus, the high reaction time of these methods does not allow optimal control of the wave energy system, and the recovered power is therefore not optimal. Furthermore, these methods do not allow optimizing the power produced by the converter machine because they do not take the converter machine efficiency into account.

SUMMARY OF THE INVENTION

To overcome these drawbacks, the present invention provides a method of controlling a wave energy system, wherein the force exerted by the waves on the mobile float of the wave energy system is estimated, then at least one dominant frequency of the force exerted by the waves on the mobile float is determined using an unscented Kalman filter (UKF), and the control of the wave energy system is determined by a variable-gain PI control law whose coefficients are a function of the dominant frequency. The control method according to the invention allows adapting the coefficients (gains) of the P and I actions, automatically and continuously, to the current sea state to maximize the power recoverable with the PI control structure. This is done through the agency of an online estimation, using an unscented Kalman filter (UKF), of the dominant frequency (or frequencies) of the wave spectrum.

The invention relates to a method of controlling a wave energy system that converts the energy of waves into electrical or hydraulic energy. The wave energy system comprises at least one mobile float in connection with an energy converter machine, and the mobile float has an oscillating motion with respect to the converter machine. For this method, the following steps are carried out:
- a) measuring the position and/or the velocity and/or the acceleration of the mobile float,
- b) estimating the force exerted by the waves on the mobile float using the measurement of at least one of the position and the velocity of the mobile machine,
- c) determining at least one dominant frequency of the force exerted by the waves on said mobile float using an unscented Kalman filter,
- d) determining a control value of the force exerted by the converter machine on the mobile float to maximize the power generated by the converter machine, by use of a variable-gain proportional integral PI control law whose coefficients are determined by use of the dominant frequency of the force exerted by the waves on the mobile float, and
- e) controlling the converter machine by use of the control value.

According to an embodiment, the proportionality coefficient Kp of the PI control law is determined by use of an optimal load resistance curve from the dominant frequency of the force exerted by the waves on the mobile float.

Advantageously, the integral coefficient Ki of the PI control law is determined by use of an optimal load reactance curve from the dominant frequency of the force exerted by the waves on the mobile float.

Advantageously, the optimal load resistance Rc and the optimal load reactance Xc are determined by solving the optimization problem as follows:

$$\min_{R_c X_c}\left\{-\frac{R_c}{(X_c+X_i)^2+(R_c+R_i)^2}\left(\eta_p-\frac{\eta_n-\eta_p}{\pi}\left(\frac{X_c}{R_c}-\arctan\left(\frac{X_c}{R_c}\right)\right)\right)\right\}$$

with $$\begin{cases} R_i(\omega)=B_{pa}(\omega) \\ X_i(\omega)=\omega\left(M+M_\infty+M_{pa}(\omega)-\frac{K_{pa}}{\omega^2}\right) \end{cases}$$

where $\omega$ is the excitation frequency, $B_{pa}(\omega)$ is the radiation resistance of the mobile float, M the mass of the mobile float, $M_{pa}(\omega)$ is the added mass and $M_\infty$ is the infinite-frequency added mass, $K_{pa}$ is the hydrostatic stiffness of the mobile float, $\eta_p$ is the motor efficiency of the converter machine and $\eta_{pn}$ is the generator efficiency of the converter machine.

Preferably, at least one of the optimal load resistance and the optimal load reactance curves are determined prior to carrying out the steps of the method.

According to an implementation, the power generated by the converter machine is maximized by accounting for the efficiency of the converter machine.

According to a characteristic, the PI control law is written with an equation of the type: $f_u(t)=K_p v(t)+K_i p(t)$, with $f_u(t)$ being the control of the force exerted by the converter machine on the mobile float, v(t) is the velocity of the mobile float, p(t) is the position of the mobile float, Kp is the proportionality coefficient of the PI control law and Ki is the integral coefficient of the PI control law.

According to an embodiment, the control law is a variable-gain PID proportional-integral-derivative control law.

Advantageously, the PID proportional-integral-derivative control law is written in the form as follows: $f_u(t)=K_p v(t)+K_i p(t)+K_d a(t)$, with $f_u(t)$ being the control of the force exerted by the converter machine on the mobile float, v(t) being the velocity of the mobile device, p(t) being the position of the mobile float, a(t) being the acceleration of the mobile float, Kp being the proportionality coefficient of the PID control law, Ki being the integral coefficient of the PID control law and Kd being the derivative coefficient of the PID control law.

According to an embodiment option, the dominant frequency of the force exerted by the waves on the mobile float is determined by modelling the force exerted by the waves on the mobile float as a sine wave signal or as the sum of two sine wave signals.

According to an implementation of the invention, at least one of the position and the velocity of the mobile float is estimated using a dynamic model that represents the evolution of the position and of the velocity of the mobile float.

Advantageously, the dynamic model comprises a model of the radiation force.

Preferably, the energy converter machine is an electrical machine or a hydraulic machine.

BRIEF DESCRIPTION OF THE DRAWINGS

Other features and advantages of the method according to the invention will be clear from reading the description hereafter, with reference to the accompanying figures wherein.

DETAILED DESCRIPTION OF THE INVENTION

Figure 1:
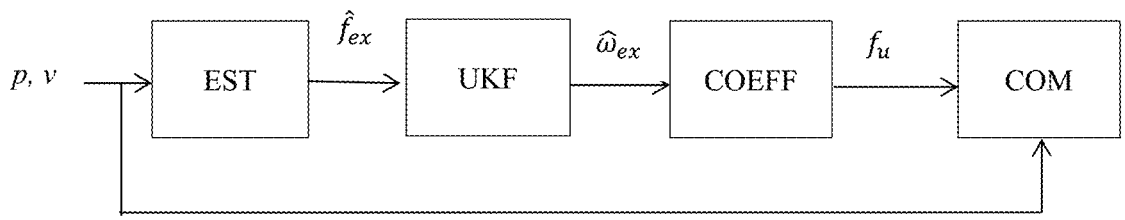
FIG. 1 illustrates the steps of the method according to an embodiment of the invention.

The invention relates to a method of controlling a wave energy system that comprises at least one mobile device such as a float for example cooperating with at least one energy converter machine (also referred to as Power Take-Off PTO). The mobile float has an oscillating motion with respect to the converter machine, under the action of the waves (or wave motion) and of the converter machine. The converter machine converts the mechanical energy of the motion of the mobile device into electrical energy. The converter machine can therefore be a simple electrical machine or a more complex device including other machines, such as a hydraulic machine. The converter machine can be considered as the actuator through which the control system drives the operation of the wave energy system.

Notations

The following notations are used in the description below:
$f_u$: force exerted by the converter machine on the mobile float,
$f_{ex}$: force exerted by the waves on the mobile float,
p: position of the mobile float with respect to the equilibrium point thereof,
v: velocity of the mobile float,
a: acceleration of the mobile float,
ω: frequency of the motion of the mobile float,
M: mass of the mobile float,
$Z_{pa}$: radiation impedance, which is a parameter which is a function of frequency and it is determined experimentally or from the calculation of the hydrodynamic coefficients of the mobile float, which allows accounting for the radiation phenomenon, where the motion of the mobile float in the water creates a radiated wave that dampens the float (that is which dampens the motion),
$K_{pa}$: hydrostatic stiffness coefficient,
$B_{pa}$: radiation resistance, which is the real part of the radiation impedance,
$M_{pa}$: added mass, which parameter is a function of frequency and is determined experimentally or from the calculation of the hydrodynamic coefficients of the mobile float, which allows accounting for the phenomenon that increases the equivalent mass of the mobile float, due to the water particles carried along by the motion thereof,
$M_\infty$: infinite-frequency added mass,
$P_a$: average power generated by the wave energy system,
t: continuous time,
S: Laplace variable,
k: discrete time,
η: energy conversion efficiency, with
$\eta_p$: motor efficiency of the converter machine; these are manufacturer's data or experimentally determined data,
$\eta_n$: generator efficiency of the converter machine; these are manufacturer's data or experimentally determined data,
$Z_i$: intrinsic impedance of the mobile float of the wave energy system, this known parameter is a function of frequency and it results from modelling the mobile device on the basis of the linear wave theory, determined from the hydrodynamic coefficients of the mobile means and possibly experimental measurements,
$R_i$: intrinsic resistance of the mobile float of the wave energy system, i.e. the real part of the intrinsic impedance,
$X_i$: intrinsic reactance of the mobile float of the wave energy system, i.e. the imaginary part of the intrinsic impedance,
$K_p$: proportionality coefficient of the PI control law,
$K_i$: integral coefficient of the PI control law,
$K_d$: derivative coefficient of the PID control law,
$Z_c$: control law (or load) impedance,
$R_c$: control law (or load) resistance, with
$R_v^D$: optimal resistance for a given sea state,
$X_c$: control law reactance, with
$X_c^0$: optimal resistance for a given sea state,
A: wave motion amplitude,
$\hat{\omega}_{ex}$: estimation of the dominant frequency of the wave,
$\hat{f}_{ex}$: estimation of the force exerted by the wave on the mobile float,
$T_s$: sampling period,
φ: signal phase shift,
$A_x$: state model matrix,
C: state model matrix,
v(k): Gaussian noise with covariance matrix Q,
μ(k): Gaussian noise with covariance matrix R,
$P_x$: covariance matrix of x(k).

For these notations, the estimated values are generally written with a hat. Time is denoted by t (continuous variable) or k (discrete variable).

In the description below and for the claims, the terms waves, sea waves and wave motion are considered to be equivalent.

The invention relates to a method of controlling a wave energy system. FIG. 1 shows the various steps of the method according to the invention:
1. Measurement of the position and/or the velocity of the mobile float (p, v)
2. Estimation of the force exerted by the waves (EST)
3. Determination of the dominant frequency (UKF)
4. Determination of the control value (COEFF)
5. Control of the converter machine (COM).

Steps 1 to 5 are carried out in real time, in a real-time loop. However, according to an embodiment of the invention, determination of the control value can comprise calculating optimal load resistance and reactance curves beforehand.

Advantageously, the control method according to the invention can be implemented by performing computation by, a computer for example, or a processor, in particular an on-board processor.

Step 1—Measurement of the Position and/or the Velocity of the Mobile Float (p, v)

The position and/or the velocity of the mobile float are measured in this step. The position corresponds to the motion (distance or angle for example) with respect to the equilibrium position of the mobile float. These measurements can be performed using sensors, generally implemented on a wave energy system for control and/or supervision thereof.

According to an implementation of the invention, in this step, it is also possible to measure or to estimate the acceleration of the mobile float, and this measurement or estimation can be used in the next steps of the method according to the invention. For example, the acceleration can be measured using an accelerometer arranged on the mobile float.

Step 2—Estimation of the Force Exerted by the Waves (EST)

In this step, the force exerted by the waves on the mobile float is estimated in real time. Estimation of the wave force is performed from the available measurements (position and/or velocity and/or acceleration) obtained in the previous step. The force exerted by the waves on the mobile float is estimated online and in real time to enable real-time control. A fast estimation method can be selected with a view to control with an optimal response time.

For this step of the method, any type of estimation of the force exerted by the waves on the mobile float may be considered.

According to an embodiment of the invention, the force exerted by the waves on the mobile float can be estimated using an estimator based on a dynamic model of the wave energy system. In this case, a dynamic model of the wave energy system can be constructed. The dynamic model represents the dynamic behaviour due to the motion of the elements that make up the wave energy system under the action of the waves and under the action of the force command given to the converter machine. The dynamic model is a model relating the velocity of the mobile float to the force exerted by the waves on the mobile float and to the force command given to the converter machine, which is in turn translated into a force exerted by the converter machine on the mobile float.

According to an embodiment of the invention, the dynamic model can be obtained by applying the fundamental principle of dynamics to the mobile float of the wave energy system. For this application, the force exerted by the waves on the mobile float and the force exerted by the converter machine on the mobile float are notably taken into account.

According to an implementation of the invention, a wave energy system with a floating part (mobile float) whose translational or rotational oscillating motion is constrained in a single dimension may be considered. It is then assumed that the translational or rotational motion can be described by a linear model in form of a state including the dynamics of the float with its interaction with the waves and the dynamics of the power take-off (PTO) system, or converter machine, forming the actuator of the system.

In the rest of the description below, only a unidirectional motion is considered for the dynamic model. However, the dynamic model can be developed for a multidirectional motion.

According to an example embodiment, the force exerted by the waves on the mobile float can be estimated in real time using a method of determining the excitation force exerted by the incident waves on a mobile float of a wave energy system, by use of a model of the radiation force, as described in patent application No. FR-16/53,109. As a reminder, the radiation force is the force applied onto the mobile float and is generated by the very motion of the mobile float, unlike the wave excitation force that is generated by the waves only.

Step 3—Determination of the Dominant Frequency

In this step, at least one dominant frequency of the force exerted by the waves on the mobile float (determined in the previous step) is determined. What is referred to as dominant frequency is the frequency corresponding to the peak (maximum) of the spectrum thereof. The dominant frequency is determined using an unscented Kalman filter (UKF). An unscented Kalman filter is based on the unscented transformation theory which provides an estimator for a non-linear system without having to linearize it beforehand applying the filter. The UKF filter uses a statistical state distribution that is propagated through the non-linear equations. Such a filter affords the advantage of providing stability, and therefore robustness of the estimation.

According to an embodiment of the invention, the excitation force of the wave is modelled as a time-varying sine wave signal:

$$f_{ex}(t) = A(t)\sin(\omega(t)t + \phi(t))$$

where $A(t)$, $\omega(t)$ and $\phi(t)$ are the amplitude, the frequency and the phase shift of the signal respectively. It is an approximation because this force is not in reality a varying-parameter sinusoid. In the linear wave theory, it is rather modelled as a superposition of constant-parameter sinusoids.

Alternatively, the excitation force of the wave can be modelled as the sum of two time-varying sine wave signals:

$$f_{ex}(t) = A_1(t)\sin(\omega_1(t) + \phi_1(t)) + A_2(t)\sin(\omega_2(t) + \phi_2(t))$$

These (time-varying) wave excitation force modelling parameters need to be estimated. Since they are entered non-linearly into the above equation, it is a non-linear estimation problem.

The unscented Kalman filter method is used to estimate $A(t)$, $\omega(t)$ and $\phi(t)$.

It is noted that other non-linear estimation methods could in principle be used to carry out this step, such as the extended Kalman filter (EKF) or the particle filter, but the UKF gives particularly good results. The use of the EKF filter in particular has been mentioned in the literature; however, as it is based on the local linearization of a non-linear model, it does not guarantee the same estimation stability and therefore robustness as the UKF filter.

To apply the UKF filter, the equation modelling the excitation force is first put in discrete-time state form.

Let $T_s$ be the sampling period of the filter. The wave excitation force is then estimated in discrete time $t = kT_s$, $k = 0, 1, 2, \ldots$, which is simply denoted by k.

By defining $$\begin{cases} x_1(k) = A\sin(kT_s\omega + \phi) \\ x_2(k) = A\cos(kT_s\omega + \phi), \\ x_3(k) = \omega \end{cases}$$

and assuming that $\omega(k)$ changes slowly over time (in relation to the sampling period), the model can be obtained in state form as follows:

$$\begin{cases} \begin{bmatrix} x_1(k) \\ x_2(k) \\ x_3(k) \end{bmatrix} = \begin{bmatrix} \cos(T_s x_3(k-1)) & \sin(T_s x_3(k-1)) & 0 \\ -\sin(T_s x_3(k-1)) & \cos(T_s x_3(k-1)) & 0 \\ 0 & 0 & 1 \end{bmatrix} \begin{bmatrix} x_1(k-1) \\ x_2(k-1) \\ x_3(k-1) \end{bmatrix} + \begin{bmatrix} v_1(k-1) \\ v_2(k-1) \\ v_3(k-1) \end{bmatrix}, \\ f_{ex}(k) = \begin{bmatrix} 1 & 0 & 0 \end{bmatrix} \begin{bmatrix} x_1(k) \\ x_2(k) \\ x_3(k) \end{bmatrix} + \mu(k) \end{cases}$$

In this model, uncertainties were added to take account for modelling errors. More particularly, $v_1(k-1)$ and $v_2(k-1)$ serve to make up for the time-varying nature of $A(t)$, $\omega(t)$ and $\phi(t)$ that is not taken into account in the definition of the states $x_1(k)$ and $x_2(k)$. $v_3(k-1)$ is an uncertainty of the third state (the frequency to be estimated), which is naturally correlated with $v_1(k-1)$ and $v_2(k-1)$. $\mu(k)$ is an uncertainty that can be equated with a measurement error on $f_{ex}(k)$, which serves to account for the fact that $f_{ex}(k)$ is not exactly a sinusoid.

By noting:

$$x(k) = [\, x_1(k) \quad x_2(k) \quad x_3(k)\,]^T,$$

$$v(k) = [\, v_1(k) \quad v_2(k) \quad v_3(k)\,]^T,$$

$$y(k) = f_{ex}(k)$$

and $$\begin{cases} A_x = \begin{bmatrix} \cos(T_s x_3(k-1)) & \sin(T_s x_3(k-1)) & 0 \\ -\sin(T_s x_3(k-1)) & \cos(T_s x_3(k-1)) & 0 \\ 0 & 0 & 1 \end{bmatrix}, \\ C = [\,1 \quad 0 \quad 0\,] \end{cases}$$

the equations of the state model are written as follows:

$$\begin{cases} x(k) = A_x x(k-1) + v(k) \\ y(k) = Cx(k) + \mu(k) \end{cases},$$

The following assumptions are adopted:
  the initial state $x(0)$ is a random vector of mean $m(0)=E[x(0)]$ and of covariance $P(0)=E[(x(0)-m(0))(x(0)-m(0))^T]$,
  $v(k)$ and $\mu(k)$ are Gaussian noises with covariance matrices Q and R respectively,
as well as the following notations:
  $x(k|k-1)$ is the estimation of $x(k)$ from measurements up to the time $k-1$, that is $y(k-1), y(k-2), \ldots$.
  $x(k|k)$ is the estimation of $x(k)$ from measurements up to the time $k$, that is $y(k), y(k-1) \ldots$.
  $P_x(k|k-1)$ is the covariance matrix of $x(k)$ from measurements up to the time $k-1$, that i $y(k-1), y(k-2), \ldots$.
  $P_x(k|k)$ is the covariance matrix of $x(k)$ from measurements up to the time $k$, that is $y(k), y(k-1) \ldots$.
There are three steps in the UKF method:

1. Calculation of the Sigma Points

In this first step, a set of samples in the state space is calculated which are referred to as sigma points, and indeed represent the probabilistic distribution of the state according to the mean and covariance parameters thereof.
Let:

$$W_0^m = \frac{\lambda}{n+\lambda},$$

$$W_0^c = \frac{\lambda}{n+\lambda} + (1 - \alpha^2 + \beta),$$

$$W_j^m = W_j^c = \frac{\lambda}{2(n+\lambda)}, j=1,2,\ldots,2n$$

where $\lambda=(\alpha^2-1)n$ is a scaling parameter, $\alpha$ is a parameter that determines the spread of the sigma points around $x(k-1|k-1)$, which is generally assigned a small positive value, $10^{-3}$ for example, $\beta$ is a parameter used to incorporate a priori knowledge on the distribution of $x$: for a Gaussian distribution, $\beta=2$ which is optimal.

At the time $k-1$, the following selection is considered of sigma points (set of points encoding exactly the mean and covariance information):

$$x_0(k-1) = x(k-1|k-1),$$

$$x_i(k-1) = x(k-1|k-1) + \sqrt{n+\lambda} S_i(k-1), i=1,2,\ldots,n$$

$$x_{i+n}(k-1) = x(k-1|k-1) - \sqrt{n+\lambda} S_i(k-1), i=1,2,\ldots,n$$

where $S_i(k-1)$ is the i-th column of the matrix square root of $P_x(k-1|k-1)$, that is $P_x(k|k-1)=S(k-1)_T S(k-1)$.

2. Prediction Updating

Each sigma point is propagated through the non-linear model representing the evolution of the states:

$$x_j(k|k-1) = A_x x_j(k-1), j=0,1,\ldots,2n$$

The mean and the covariance of $\hat{x}(k|k-1)$, the prediction of $x(k|k-1)$ $$\hat{x}(k|k-1) = \sum_{j=0}^{2n} W_j^m \hat{x}_j(k|k-1),$$

$$P_x(k|k-1) = \sum_{j=0}^{2n} W_j^c (\hat{x}_j(k|k-1) - x(k|k-1))(\hat{x}_j(k|k-1) - x(k-k-1))^T + Q$$

The predicted states $\hat{x}_j(k|k-1)$ are used in the output state equation, which yields:

$$\hat{y}_j(k|k-1) = C\hat{x}_j(k|k-1)$$

The mean and the covariance of $\hat{y}(k|k-1)$ are calculated as follows:

$$\hat{y}(k|k-1) = \sum_{j=0}^{2n} W_j^m \hat{y}_j(k|k-1),$$

$$P_y(k|k-1) = \sum_{j=0}^{2n} W_j^c (\hat{y}_j(k|k-1) - y(k|k-1))(\hat{y}_j(k|k-1) - y(k|k-1))^T + R$$

while the cross-covariance between $\hat{x}(k|k-1)$ and $\hat{y}(k|k-1)$ is:

$$P_{xy}(k|k-1) = \sum_{j=0}^{2n} W_j^c (\hat{x}_j(k|k-1) - x(k|k-1))(\hat{y}_j(k|k-1) - y(k|k-1))^T$$

3. Updating from the Measurements

As in the Kalman filter, the final state estimation is obtained by correcting the prediction with a feedback on the output prediction error (measured):

$$\hat{x}(k) = \hat{x}(k|k-1) + K(\hat{y}(k) - \hat{y}(k|k-1))$$

where gain K is given by:

$$K = P_{xy}(k|k-1) P_y(k|k-1)^{-1}$$

The a posteriori covariance estimation is updated with the formula as follows:

$$P_x(k|k) = P_x(k|k1) K P_y(k|k1) K^T$$

Step 4—Determination of the Control Value (VAL)

In this step, the control value of the force exerted by the converter machine on the mobile float is determined to maximize the power generated by the converter machine. This determination is performed using a variable-gain proportional-integral control law whose coefficients (the variable gains) are determined as a function of the dominant frequency of the force exerted by the waves on the mobile float.

According to an implementation of the invention, the control law can be a variable-gain proportional-integral-derivative type control law.

According to an embodiment, a force-velocity dynamic model can be written for this type of wave energy system in frequency form:

$$\left(j\omega M + Z_{pa}(j\omega) + \frac{K_{pa}}{j\omega}\right)v(j\omega) = f_{ex}(j\omega) - f_u(j\omega)$$

where:
- $v(j\omega)$ is the velocity of the mobile float,
- $f_{ex}(j\omega)$ and $f_u(j\omega)$ are the excitation force of the incident wave and the force applied by the converter machine onto the mobile float, respectively,
- M is the mass of the mobile float (float for example) and of all the other parts of the wave energy system secured to this mobile float,
- $Z_{pa}(j\omega)$ is the radiation impedance,
- $K_{pa}$ is the hydrostatic stiffness.

This model is obtained from the Cummins integro-differential equation, and its coefficients $K_{pa}$ and $Z_{pa}(j\omega)$ (and those resulting from its decomposition, below) can be calculated using hydrodynamic codes based on the boundary element method (BEM), such as WAMIT, Diodore or NEMOH. The radiation impedance $Z_{pa}(j\omega)$ which, in the linear wave theory, describes the effect of the free motion of the float in the water, is the result of an approximation of the radiation impulse response of an infinite impulse response filter. It can be decomposed as follows:

$$Z_{pa}(j\omega) = B_{pa}(j\omega) + j\omega(M_{pa}(j\omega) + M_\infty)$$
$$= H_{pa}(j\omega) + j\omega M_\infty$$

where $B_{pa}(j\omega)$ is the radiation resistance, $M_{pa}(j\omega)$ is the added mass after removal of the infinite singularity $M_\infty$ and $H_{pa}(j\omega) = B_{pa}(j\omega) + j\omega M_{pa}(j\omega)$.

The velocity of the float, as a function of the forces applied thereon, can be rewritten as follows:

$$v(j\omega) + \frac{1}{Z_j(j\omega)}(f_{ex}(j\omega) - f_u(j\omega))$$

where the intrinsic impedance $Z_i(j\omega)$ is defined as:

$$Z_i(j\omega) = B_{pa}(\omega) + j\omega\left(M + M_\infty + M_{pa}(\omega) - \frac{K_{pa}}{\omega^2}\right) - R_i(\omega) + jX_i(\omega)$$

where $$\begin{cases} R_i(\omega) = B_{pa}(\omega) \\ X_i(\omega) = \omega\left(M + M_\infty + M_{pa}(\omega) - \frac{K_{pa}}{\omega^2}\right) \end{cases}$$

are respectively the intrinsic resistance and reactance (real part and imaginary part of the impedance) of the system.

In this step, optimization of the performances of the control law in terms of maximization of the electrical power produced on average $P_a$:

$$P_a = \frac{1}{T}\int_{t=0}^{T} \eta f_u(t)v(t)dt$$

where $\eta$ is a coefficient representing the converter machine efficiency. If $\eta=1$, the converter machine is considered to be perfect, with no energy conversion losses. Although this assumption is unrealistic, it is often adopted in the literature because it greatly simplifies the calculations, in this case for the optimal parameters of a PI type control law. It however amounts to considering that drawing power from the grid through the converter machine costs the same as delivering power, which is generally wrong and may lead to a much lower electrical energy production than expected, or even to grid energy waste ($P_a$ negative).

According to an implementation, efficiency $r_i$ can be considered to be a function of the instantaneous power $f_u v$ defined as follows:

$$\eta(f_u v) = \begin{cases} \eta_p \text{ if } f_u v \geq 0 \\ \eta_n \text{ if } f_u v < 0 \end{cases}$$

where coefficients $0 < \eta_p \leq 1$ and $\eta_n \geq 1$ depend on the converter machine and may even be a function of $f_u v$.

This step is a PI control law for hydrodynamic control of a wave energy system:

$$f_u(t) = K_p v(t) + K_i p(t) = K_p v(t) + K_i \int_0^t v(\tau)d\tau$$

that is, in the Laplace domain:

$$f_u(s) - K_p v(s) + \frac{K_i}{s}v(s), s - \sigma + j\omega$$

whose parameters $K_p$ and $K_i$ are continuously adapted, that is online and in real time, as a function of the estimated dominant frequency of the excitation force of the wave, so as to guarantee that the electrical power produced is maximized for this frequency.

Alternatively, the control law is a PID law that can be written for the control of a wave energy system:

$$f_u(t) = K_p v(t) + K_i p(t) + K_d a(t)$$

Figure 3:
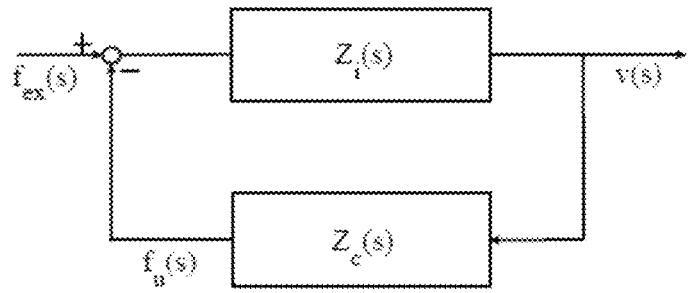
FIG. 3 illustrates a modelling of the wave energy system and of the control thereof.

Maximization of the electrical power produced is based on an analytical (original) expression relating, frequency by frequency. The power of the real part (resistance) and of the imaginary part (reactance) of the impedance achieved by the control law, assuming that the force applied by the converter machine is a linear feedback on the velocity of the mobile float of the wave energy system (see FIG. 3) may be expressed as:

$$f_u(s) = Z_c(s)v(s)$$

After denoting by $$\begin{cases} R_c = \text{Re}\{Z_c\} \\ X_c = \text{Im}\{Z_c\} \end{cases}$$

the resistance and the reactance of the control law (or load) impedance at a given frequency (the dominant frequency of the wave excitation force), the analytical expression for the electrical power at this frequency is:

$$P_a = \frac{A^2 R_c}{2((X_c + X_i)^2 + (R_c + R_i)^2)}\left(\eta_p - \frac{\eta_n - \eta_p}{\pi}\left(\frac{X_c}{R_c} - \arctan\left(\frac{X_c}{R_c}\right)\right)\right)$$

where $P_i$ and $X_i$ are calculated at the frequency in question from the model of the wave energy system. Parameter A can be obtained from the wave force estimation (but, as shown hereafter, it is not necessary to calculate it), and $R_c$ and $X_c$ need to be determined for the same frequency by solving the optimization problem as follows:

$$\min_{R_c X_c} \left\{ -\frac{R_c}{(X_c + X_i)^2 + (R_c + R_i)^2} \left( \eta_p - \frac{\eta_n - \eta_p}{\pi} \left( \frac{X_c}{R_c} - \arctan\left(\frac{X_c}{R_c}\right) \right) \right) \right\}$$

which amounts to maximizing the power defined above. It is noted that parameter A can be left out since it does not influence the optimal solution.

Since this optimization problem is non-linear, there is no closed analytical solution thereto but it can be solved numerically. Offline, parameters $R_c$ and $X_c$ can therefore be calculated numerically for each frequency in the interval of interest, to obtain curves connected to the dominant frequency of the wave force. These curves are queried online in order to obtain the optimal parameters $R_c^o, X_c^o$ from $\hat{\omega}_{ex}$, the estimation of the dominant frequency of the wave.

The optimal gains of the PI control law are then calculated as:

$$\begin{cases} K_p^o = R_c^o \\ K_i^o = -\hat{\omega}_{ex} X_c^o \end{cases}$$

Figure 2:
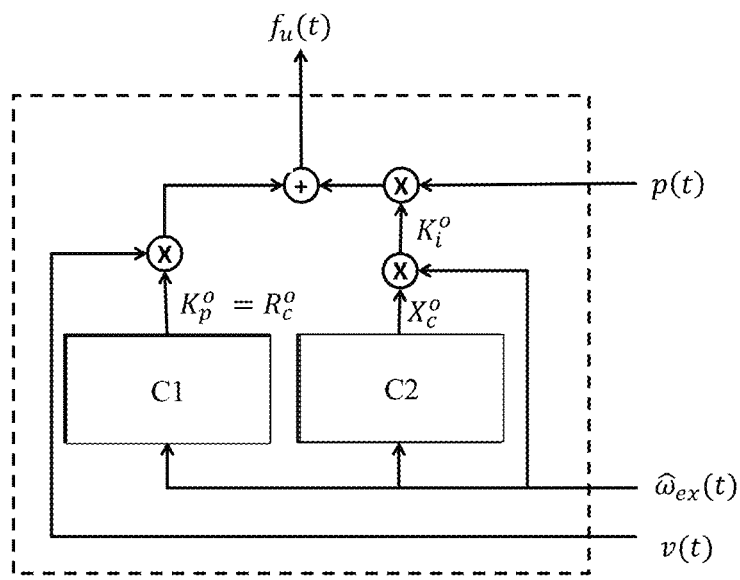
FIG. 2 illustrates the determination of the control value according to an embodiment of the invention.

The control step is schematized by way of non-limitative example in FIG. 2. At the input of this step of determining the control value, there are estimations of the dominant frequency of the wave excitation force $\hat{\omega}_{ex}$, and the measurements of the velocity v(t) and the position p(t) of the mobile float. By use of a curve C1, an optimal load resistance curve that can be obtained offline, and the dominant frequency of the wave excitation force $\hat{\omega}_{ex}$, the optimal load resistance $R_c^o$ corresponding to the proportional coefficient of the PI control law $K_p^o$ is determined. In parallel, by use of a curve C2, an optimal load reactance curve can be obtained offline, and of the dominant frequency of the wave excitation force $\hat{\omega}_{ex}$, the optimal load reactance $X_c^o$ is determined. The integral coefficient of the PI control law $K_i^o$ is obtained by multiplying the optimal load reactance $X_c^o$ by the dominant frequency of the wave excitation force $\hat{\omega}_{ex}$. The control law $f_u(t)$ is then obtained by adding the multiplication of the proportional coefficient $K_p^o$ by the velocity v(t) to the multiplication of integral coefficient $K_i^o$ by the position p(t).

Alternatively, it is possible to first perform offline the construction of curves of optimal coefficients $K_i$ and $K_p$ as a function of the dominant frequency of the wave force, and then to determine online coefficients $K_i$ and $K_p$ from these curves and the dominant frequency exerted by the wave force. Thus, the control law is completely defined.

According to the embodiment where the control law is a PID control law, the variable coefficient Kd of the control law can be obtained using the estimation of a second dominant frequency (by modelling the waves with two sinusoids for example).

Step 5—Control of the Converter Machine

In this step, the converter machine is controlled as a function of the value determined in the previous step. The converter machine (electrical or hydraulic machine) is therefore actuated to reproduce the new value of force $f_u$ as determined in step 4.

For example, the new expression for the control of force u allowing obtaining a force $f_u$ exerted by the converter machine on the mobile float is applied to the control system of the electrical machine. Controlling the electrical machine so that it applies the corresponding force $f_u$, down to the dynamics of the machine, to the requested control u is achieved by modifying, if need be, the electrical current applied to the electrical machine. More precisely, to provide a torque or a force that drives the mobile float, a current is applied by supplying electrical power. On the other hand, to produce a torque or a force withstanding the motion of the mobile float, a current is applied by recovering electrical power.

Figure 4:
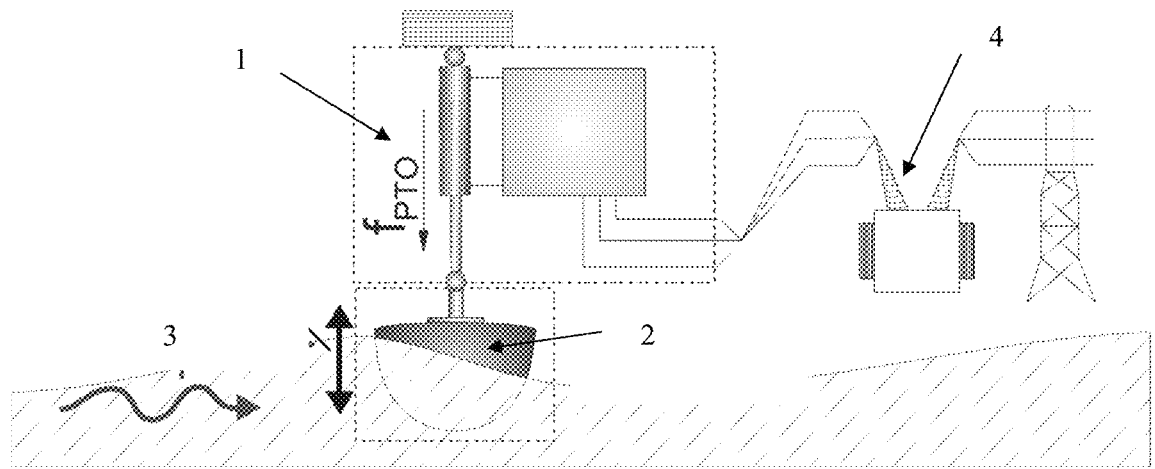
FIG. 4 illustrates a wave energy system according to an embodiment example.

A non limitative example of a wave energy system is an oscillating buoy as shown in FIG. 4. This wave energy system comprises a buoy 2 as the mobile float of mass m, a converter machine 1 with its control law, whose action $f_{PTO}$ can be represented by a damping d and an elasticity k. The buoy is subjected to an oscillating motion through waves 3 and the force $f_{PTO}$ applied by the converter machine. Converter machine 1 can be an electrical machine connected to an electric grid 4.

APPLICATION EXAMPLE

The features and advantages of the method according to the invention will be clear from reading the application example hereafter.

In this example, a float as described in FIG. 4 whose force-velocity dynamics (velocity response to the sum of the forces applied on the float) is given by the transfer function as follows:

$$Z_i(s) = \frac{s^6 + 208.6s^5 + 8.583 \cdot 10^4 s^4 + 8.899 \cdot 10^6 s^3 + 1.074 \cdot 10^8 s^2 + 7.031 \cdot 10^8 s}{1.44 s^7 + 300.4 s^6 + 1.237 \cdot 10^5 s^5 + 1.284 \cdot 10^7 s^4 + 1.652 \cdot 10^8 s^3 + 2.106 \cdot 10^9 s^2 + 9.988 \cdot 10^9 s + 6.539 \cdot 10^{10}}$$

The transfer function describes the dynamics of a small-scale prototype (1:20) to which the method was applied.

Figure 5A:
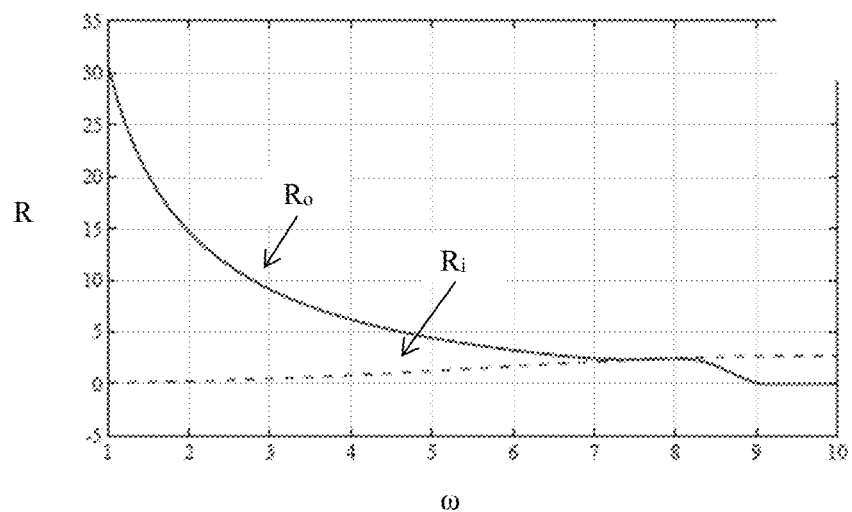
FIG. 5a illustrates an optimal load resistance curve for a first application example.
Figure 5B:
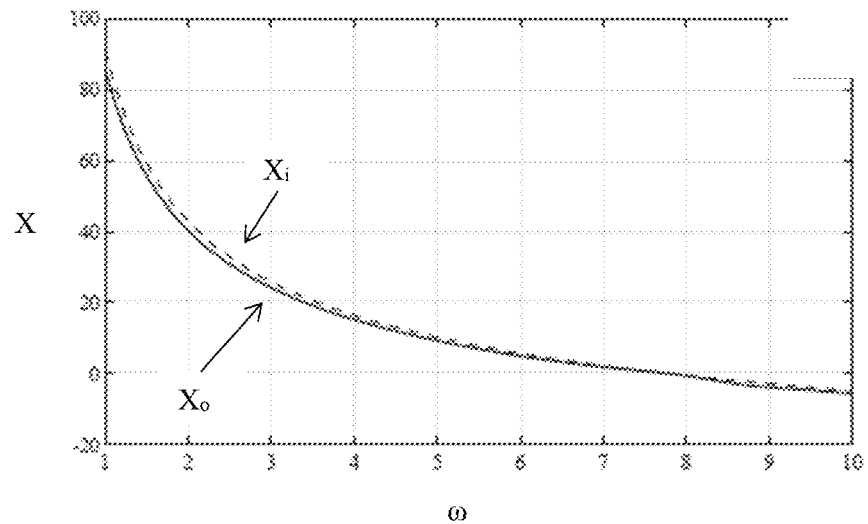
FIG. 5b illustrates an optimal load reactance curve for the first application example.

The converter machine efficiency parameters taken into account are: $\eta_p = \eta_n = 0.7$. With these parameters and the above transfer function $Z_i(s)$, the following optimization problem can be solved:

$$\min_{R_c X_c} \left\{ -\frac{R_c}{(X_c + X_i)^2 + (R_c + R_i)^2} \left( \eta_p - \frac{\eta_n - \eta_p}{\pi} \left( \frac{X_c}{R_c} - \arctan\left(\frac{X_c}{R_c}\right) \right) \right) \right\}, R_c \geq 0$$

and the two optimal load resistance and reactance curves of FIGS. 5a and 5b used for online calculation of the parameters of the PI control law are obtained.

FIG. 5a illustrates, as a function of frequency ω, the optimal resistance $R_o$ resulting from the previous optimization. This curve shows in dotted line the intrinsic resistance Ri and in solid line the optimal resistance $R_o$.

FIG. 5b illustrates, as a function of frequency ω, the optimal reactance $X_o$ resulting from the previous optimization. This curve shows in dotted line the intrinsic reactance Xi and in solid line the optimal reactance $X_o$.

Figure 6:
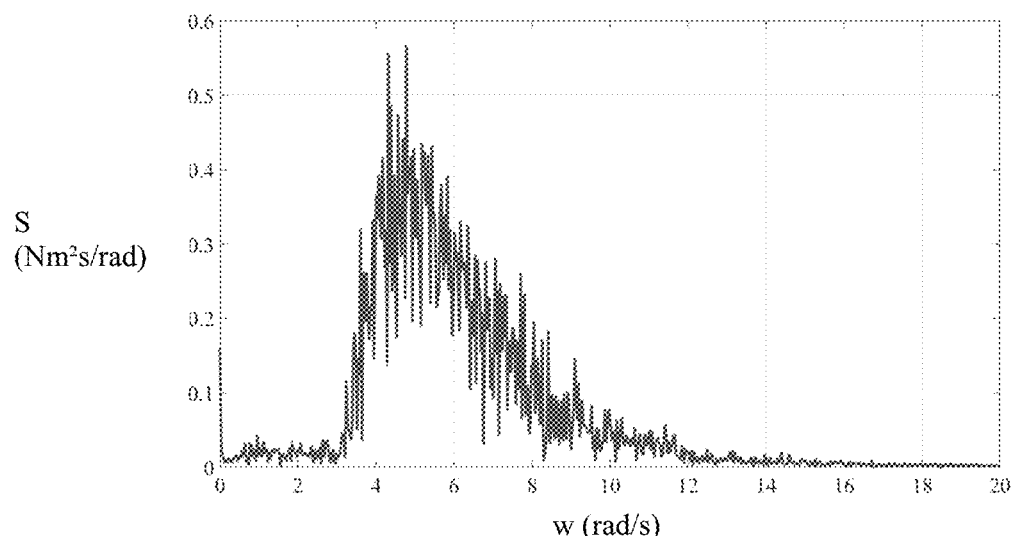
FIG. 6 illustrates a spectrum of one of the irregular waves for the first application example.

In order to validate the method, the wave energy system driven by the adaptive PI control law according to the invention was subjected to a series of irregular wave tests. The spectrum S (Nm²s/rad) of one of these waves, slightly longer than 1000 s and with a dominant frequency of approximately 5 rad/s, is shown in FIG. 6.

Figure 7:
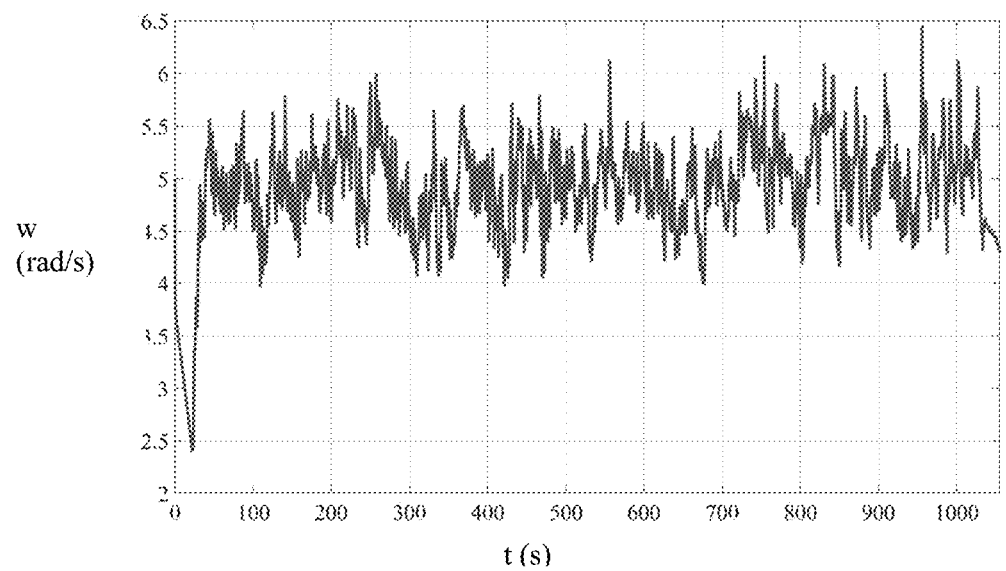
FIG. 7 illustrates an estimation of the dominant frequency of the wave force by use of the control method according to the invention for the first application example.

The good performance of the online step of estimating the dominant frequency of the force of wave w (rad/s) as a function of time t(s) with the control method according to the invention is shown in FIG. 7.

Figure 8:
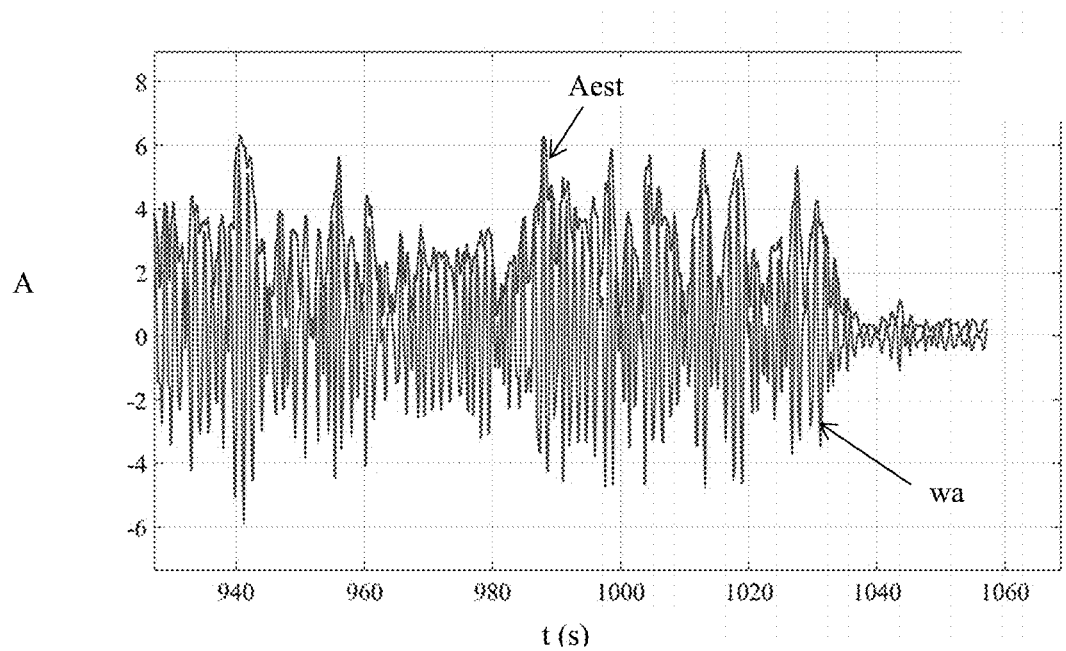
FIG. 8 illustrates an estimation of the amplitude of the wave force by use of the control method according to the invention for the first application example.

FIG. 8 illustrates the amplitude A of wave wa and the amplitude Aest (dark line) estimated with the control method according to the invention. This figure shows that the UKF algorithm used in the control method according to the invention to estimate the parameters of the variable-parameter sinusoidal model of the wave excitation force can manage great transitions (towards t=1040 s in the figure for example) while allowing to obtain stable estimations for amplitude A(t) and dominant frequency ω(t), thanks to the robustness thereof over non-linearities. Other estimation approaches, in particular EKF, would not be capable of such a performance.

Figure 9:
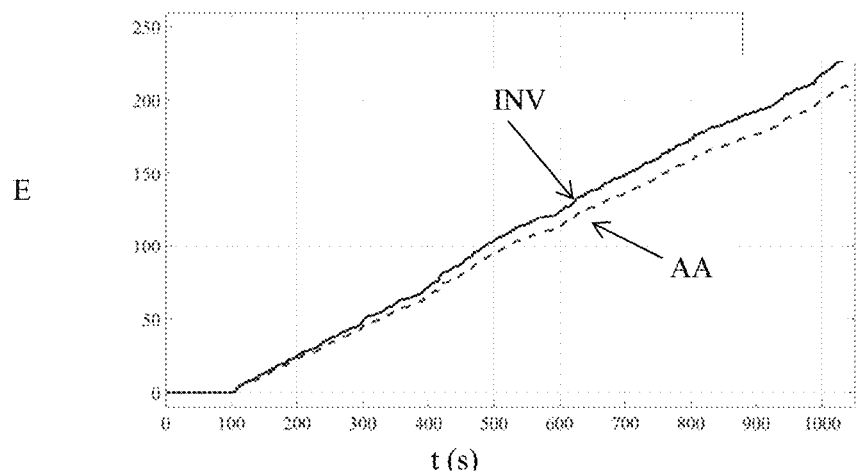
FIG. 9 illustrates a comparative curve of the energy recovered with the control method according to the invention and with a control method according to the prior art for the first application example.

FIG. 9 illustrates the energy recovered by the adaptive PI control according to the invention INV, and by a non-adaptive PI control according to the prior art AA. It is the energy recovered by the PI control according to the invention or according to the prior art with fixed parameters on an irregular wave. Thus, this curve compares the energy recovery performances, for the same wave, of the adaptive PI control law according to the invention and of a PI control law with fixed parameters optimized from the characteristics of the sea state spectrum, according to a state of the art. It is noted that the PI control law according to the invention even allows recovery of more energy than in a situation where fixed parameters according to the prior art should be sufficient.

Figure 10:
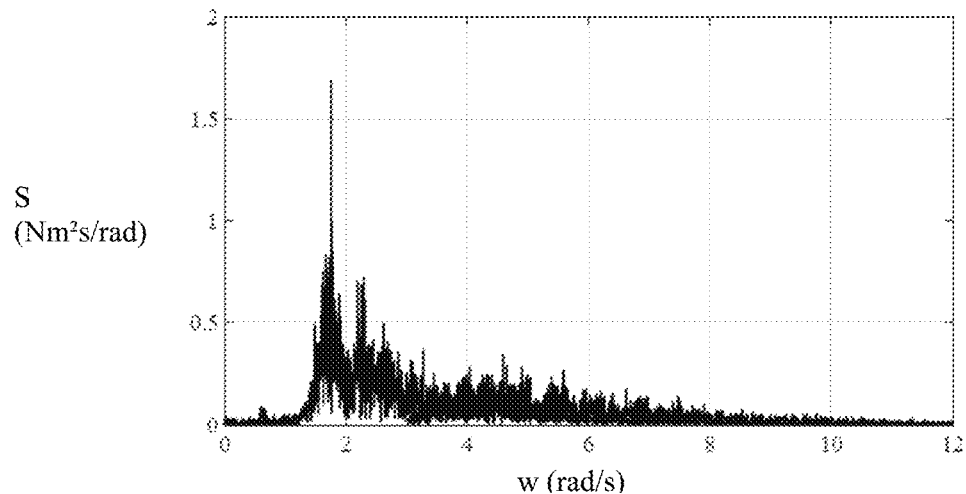
FIG. 10 illustrates a spectrum of an irregular wave for a second application example.

A second test was carried out with an irregular wave whose dominant frequency varies linearly between the frequency of the first wave tested (5 rad/s) and that of a wave of frequency 1.8 rad/s. FIG. 10 shows the spectrum S (Nm²s/rad) of the irregular wave as a function of frequency w (rad).

Figure 11:
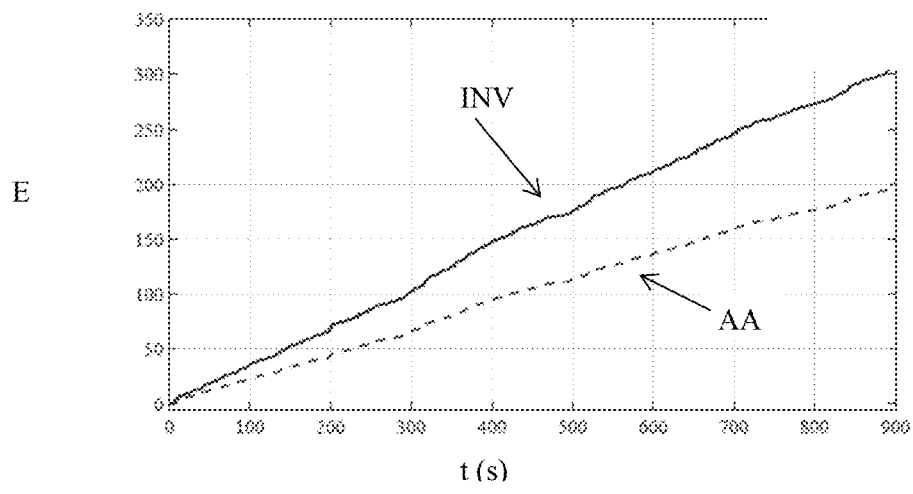
FIG. 11 illustrates a comparative curve of the energy recovered with the control method according to the invention and with a control method according to the prior art for the second application example.

FIG. 11 is a curve similar to the curve of FIG. 9 for the irregular wave whose spectrum is illustrated in FIG. 10. As shown in FIG. 11, the method according to the invention INV allows recovery of much more energy than a PI control with fixed parameters calibrated on the first spectrum, according to a prior art.

Therefore, the control method according to the invention provides an online control that optimizes the recovered energy.

The invention claimed is:

1. A method of controlling a wave energy system that converts energy of waves into electrical or hydraulic energy, the wave energy system comprising at least one mobile float in connection with an energy converter machine, and the mobile float having an oscillating motion with respect to the converter machine, comprising steps of:
   a) measuring at least one of position, velocity and acceleration of the mobile float,
   b) estimating force exerted by the waves on the mobile float using the measurement of at least one of the position and velocity of the mobile float,
   c) determining at least one dominant frequency of the force exerted by the waves on the mobile float using an unscented Kalman filter;
   d) determining a control value of the force exerted by the converter machine on the mobile float to maximize power generated by the converter machine, by use of a variable-gain proportional integral PI control law to provide the control law with coefficients determined by use of at least one of the at least one dominant frequency of the force exerted by the waves on the mobile float; and
   e) controlling the converter machine by use of the control value.

2. A method as claimed in claim 1, wherein a proportionality coefficient of the PI control law is determined by use of an optimal load resistance curve from at least one of the at least one dominant frequency of the force exerted by the waves on the mobile float.

3. A method as claimed in claim 1, wherein an integral coefficient of the PI control law is determined by use of an optimal load reactance curve from at least one of the at least one dominant frequency of the force exerted by the waves on the mobile float.

4. A method as claimed in claim 2, wherein an integral coefficient of the PI control law is determined by use of an optimal load reactance curve from at least one of the at least one dominant frequency of the force exerted by the waves on the mobile float.

5. A method as claim 2, wherein the optimal load resistance Rc and the optimal load reactance Xc are determined by solving an optimization problem as follows:

$$\min_{R_c X_c} \left\{ -\frac{R_c}{(X_c + X_i)^2 + (R_c + R_i)^2} \left( \eta_p - \frac{\eta_n - \eta_p}{\pi} \left( \frac{X_c}{R_c} - \arctan\left(\frac{X_c}{R_c}\right) \right) \right) \right\} \text{ with}$$

$$\begin{cases} R_i(\omega) = B_{pa}(\omega) \\ X_i(\omega) = \omega\left(M + M_\infty + M_{pa}(\omega) - \frac{K_{pa}}{\omega^2}\right) \end{cases}$$

where ω is the excitation frequency, $B_{pa}(\omega)$ is radiation resistance of the mobile float, M is mass of the mobile float, $M_{pa}(\omega)$ is added mass and $M_\infty$ is infinite-frequency added mass, $K_{pa}$ is hydrostatic stiffness of the mobile float, $\eta_p$ is motor efficiency of the converter machine and $\eta_{pn}$ is generator efficiency of the converter machine.

6. A method as claim 3, wherein the optimal load resistance Rc and the optimal load reactance Xc are determined by determining an optimization as follows:

$$\min_{R_c X_c} \left\{ -\frac{R_c}{(X_c + X_i)^2 + (R_c + R_i)^2} \left( \eta_p - \frac{\eta_n - \eta_p}{\pi} \left( \frac{X_c}{R_c} - \arctan\left(\frac{X_c}{R_c}\right) \right) \right) \right\} \text{ with}$$

$$\begin{cases} R_i(\omega) = B_{pa}(\omega) \\ X_i(\omega) = \omega\left(M + M_\infty + M_{pa}(\omega) - \frac{K_{pa}}{\omega^2}\right) \end{cases}$$

where ω is the excitation frequency, $B_{pa}(\omega)$ is radiation resistance of the mobile float, M is mass of the mobile float, $M_{pa}(\omega)$ is added mass and $M_\infty$ is infinite-frequency added mass, $K_{pa}$ is hydrostatic stiffness of the mobile float, $\eta_p$ is motor efficiency of the converter machine an $\eta_{pn}$ is generator efficiency of the converter machine.

7. A method as claimed in claim 2, wherein at least one of the optimal load resistance and optimal load reactance curves are determined prior to performing the method.

8. A method as claimed in claim 5, wherein at least one of the optimal load resistance and optimal load reactance curves are determined prior to performing the method.

9. A method as claimed in claim 1, wherein the power generated by the converter machine is maximized accounting for efficiency of the converter machine.

10. A method as claimed in claim 1, wherein the PI control law is expressed as an equation: $f_u(t)=K_p v(t)+K_i p(t)$, with $f_u(t)$ being the control of the force exerted by the converter machine on the mobile float, v(t) is the velocity of the mobile float, p(t) is position of the mobile float, Kp is a proportionality coefficient of the PI control law and Ki is an integral coefficient of the PI control law.

11. A method as claimed in claim 1, wherein the control law is a variable-gain PID proportional-integral-derivative control law.

12. A method as claimed in claim 11, wherein the PID proportional-integral-derivative control law is expressed as follows: $f_u(t)=K_p v(t)+K_i p(t)+K_d a(t)$, with $f_u(t)$ being the control of the force exerted by the converter machine on the mobile float, v(t) being velocity of the mobile float, p(t) being the position of the mobile float, a(t) being the acceleration of the mobile float, Kp being the proportionality coefficient of the PID control law, Ki being the integral coefficient of the PID control law and Kd being the derivative coefficient of the PID control law.

13. A method as claimed in claim 1, wherein the dominant frequency of the force exerted by the waves on the mobile float is determined by modelling the force exerted by the waves on the mobile float as a sine wave signal or a sum of two sine wave signals.

14. A method as claimed in claim 1, wherein the position and the velocity of the mobile float is estimated using a dynamic model representing evolution of the position and of velocity of the mobile device.

15. A method as claimed in claim 14, wherein the dynamic model comprises a model of radiation force.

16. A method as claimed in claim 1, wherein the energy converter machine is an electrical machine or a hydraulic machine.

17. A method as claimed in claim 2, wherein the control law is a variable-gain PID proportional-integral-derivative control law.

18. A method as claimed in claim 3, wherein the control law is a variable-gain PID proportional-integral-derivative control law.

19. A method as claimed in claim 4, wherein the control law is a variable-gain PID proportional-integral-derivative control law.

20. A method as claimed in claim 5, wherein the control law is a variable-gain PID proportional-integral-derivative control law.

* * * * *